US010909000B2

(12) United States Patent
Lee

(10) Patent No.: US 10,909,000 B2
(45) Date of Patent: *Feb. 2, 2021

(54) TAGGING DATA FOR AUTOMATIC TRANSFER DURING BACKUPS

(71) Applicant: Rubrik, Inc., Palo Alto, CA (US)

(72) Inventor: Looi Chow Lee, Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/397,675

(22) Filed: Apr. 29, 2019

(65) Prior Publication Data

US 2019/0250993 A1    Aug. 15, 2019

Related U.S. Application Data

(63) Continuation of application No. 15/853,717, filed on Dec. 23, 2017, now Pat. No. 10,303,555.

(51) Int. Cl.
| | | |
|---|---|---|
| *G06F 11/14* | (2006.01) | |
| *G06F 11/16* | (2006.01) | |
| *G06F 3/06* | (2006.01) | |
| *G06F 16/11* | (2019.01) | |

(52) U.S. Cl.
CPC .......... *G06F 11/1451* (2013.01); *G06F 3/064* (2013.01); *G06F 3/065* (2013.01); *G06F 3/067* (2013.01); *G06F 11/1446* (2013.01); *G06F 11/1464* (2013.01); *G06F 11/167* (2013.01); *G06F 16/128* (2019.01); *G06F 2201/84* (2013.01)

(58) Field of Classification Search
CPC ............. G06F 11/1451; G06F 11/1446; G06F 11/1464; G06F 3/064; G06F 3/065; G06F 3/067

USPC ........................................................ 711/162
See application file for complete search history.

(56) References Cited

U.S. PATENT DOCUMENTS

| | | | |
|---|---|---|---|
| 10,303,555 B1 | 5/2019 | Lee | |
| 2006/0206547 A1 | 9/2006 | Kulkarni et al. | |
| 2010/0333116 A1 | 12/2010 | Prahlad et al. | |
| 2011/0213754 A1* | 9/2011 | Bindal | G06F 11/1453 707/641 |
| 2012/0011101 A1 | 1/2012 | Fang et al. | |
| 2013/0262805 A1* | 10/2013 | Zheng | G06F 3/0683 711/162 |
| 2014/0108348 A1* | 4/2014 | Ahrens | G06F 11/1451 707/639 |
| 2014/0108352 A1* | 4/2014 | Ahrens | G06F 11/1451 707/645 |

(Continued)

OTHER PUBLICATIONS

"U.S. Appl. No. 15/853,717, Notice of Allowance dated Jan. 28, 2019", 9 pgs.

(Continued)

*Primary Examiner* — Than Nguyen
(74) *Attorney, Agent, or Firm* — Schwegman Lundberg & Woessner, P.A.

(57) ABSTRACT

In one approach, data blocks or files that have a history of change are tagged for automatic transfer to backup on the assumption that they have changed since the last backup. Other data blocks and files are first tested for change, for example by comparing digital fingerprints of the current data versus the previously backed up data, before transferring to backup.

23 Claims, 8 Drawing Sheets

(56) References Cited

U.S. PATENT DOCUMENTS

| | | |
|---|---|---|
| 2015/0286535 A1 | 10/2015 | Kushwah et al. |
| 2017/0171364 A1* | 6/2017 | Hu .......................... H04W 4/18 |
| 2017/0235754 A1* | 8/2017 | Zhong ................. G06F 16/1844 |
| | | 707/649 |
| 2018/0357132 A1* | 12/2018 | Maranna ............. G06F 16/1748 |
| 2019/0317862 A1 | 10/2019 | Lee |

OTHER PUBLICATIONS

"U.S. Appl. No. 16/453,234, Non Final Office Action dated Jul. 1, 2020", 7 pages.

* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| ... | | |

FIG. 3A

Job Queue 224

| job_id | start_time | job_type | job_info |
|--------|------------|----------------|----------------|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | ... |
| ... | | |

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

FIG. 3C

TAGGING DATA FOR AUTOMATIC TRANSFER DURING BACKUPS

CLAIM OF PRIORITY

This Application is a continuation of U.S. application Ser. No. 15/853,717, filed Dec. 3, 2017, which is hereby incorporated by reference in its entirety.

BACKGROUND

Technical Field

The present invention generally relates to managing and storing data, for example for backup purposes.

Background Information

The amount and type of data that is collected, analyzed and stored is increasing rapidly over time. The compute infrastructure used to handle this data is also becoming more complex, with more processing power and more portability. As a result, data management and storage is increasingly important. One aspect of this is reliable data backup and storage, and fast data recovery in cases of failure.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically also includes backup and retrieval of the virtual machines, in addition to just the application data.

As the amount of data to be backed up and recovered increases, there is a need for better approaches to transfer only the data needed to make a backup.

SUMMARY

In one approach, data blocks or files that have a history of change are tagged for automatic transfer to backup on the assumption that they have changed since the last backup. Other data blocks and files are first tested for change, for example by comparing digital fingerprints of the current data versus the previously backed up data, before transferring to backup.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIGS. 1-2, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
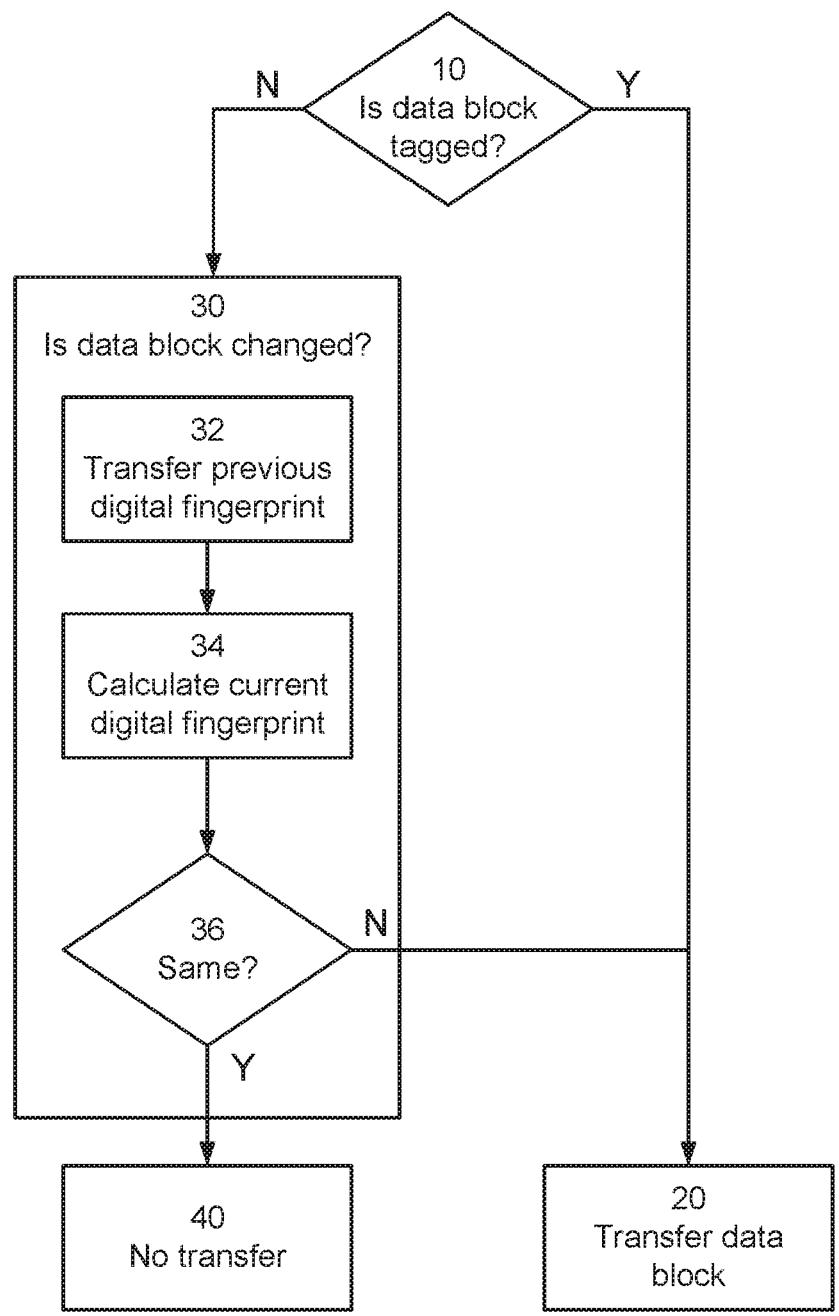
FIG. 1 is a flow diagram illustrating data backup, according to one embodiment.

FIG. 1 is a flow diagram illustrating data backup, according to one embodiment. In this example, a compute infrastructure includes multiple machines which are managed by a data management and storage (DMS) system. The DMS system provides backup services to the compute infrastructure. As part of the backup process, the DMS system pulls an incremental snapshot of a fileset from the compute infrastructure. The snapshot is incremental in that a prior snapshot is already stored in the DMS system, so that only changes from the prior snapshot are stored for the incremental snapshot.

Referring to FIG. 1, the DMS system determines 10 whether a data block in the fileset is currently tagged by the DMS system for automatic transfer. Whether the data block is tagged for automatic transfer depends on the DMS system's prior analysis of a change history of a portion of the fileset relating to the data block. For example, the DMS system might analyze the change history of the data block itself or of a file containing the data block. If the data block is currently tagged for automatic transfer, then it is transferred 20 from the compute infrastructure to the DMS system without determining whether it has actually changed, based on the assumption that it has changed. Once received at the DMS system, the data block will be analyzed to determine whether it has changed and, if so, it will be stored as part of the incremental snapshot.

If the data block is not currently tagged for automatic transfer, then it is first determined 30 whether the data block has changed. In one approach, a digital fingerprint of the previous snapshot of the data block is transferred 32 from the DMS system to the compute infrastructure. The compute infrastructure calculates 34 the digital fingerprint of the current data block and determines 36 whether the two digital fingerprints are the same. An example of a digital fingerprint is a hash. If the two digital fingerprints are the same, then the data block has not changed and it is not transferred 40 to the DMS system for backup, thus saving networking bandwidth. If the two fingerprints are different, then the data block has changed and it is transferred 20 from the compute infrastructure to the DMS system for backup. This can be repeated for all data blocks in the fileset.

Statistically, let Pr(change)=probability that the data block has changed since the last snapshot, Cost(transfer)= cost of transferring the data block from the compute infrastructure to the DMS system and Cost(fingerprint)=cost of calculating the fingerprint of the data block and comparing it to the previous fingerprint. The costs can be defined by any metric of interest: processor cycles, network bandwidth, etc. The expected cost for a data block that is tagged for automatic transfer is:

$$E\{\text{Cost(tagged)}\} = \text{Cost(transfer)} \quad (1)$$

The expected cost for a data block that is not tagged is:

$$E\{\text{Cost(not tagged)}\} = \text{Cost(fingerprint)} + Pr(\text{change}) \cdot \text{Cost(transfer)} \quad (2)$$

$$\begin{aligned}&\text{Setting } E\{\text{Cost(tagged)}\} < E\{\text{Cost(not tagged)}\} \text{ and}\\&\text{solving for } Pr(\text{change}) \text{ yields } Pr(\text{change}) > 1 -\\&\text{Cost(fingerprint)}/\text{Cost(transfer)}\end{aligned} \quad (3)$$

If the goal is to reduce the overall expected cost, then data blocks that meet Eqn. (3) should be tagged for automatic transfer.

The Pr(change) or whether a data block should be tagged for automatic transfer can be estimated using different techniques. For example, it can be estimated based on the change history of the data block—whether or to what extent the data block has changed over time—during the previous snapshot or during the previous N snapshots. It can also be estimated based on the change rate of the data block—what fraction of the data block has changed during the previous snapshot or during the previous N snapshots.

This estimation can also be done at the file level. Files to be backed up often will be subdivided into data blocks. For example, if the fingerprint block size is specified as 64 KB, then a 320 KB file will be divided into 5 data blocks of 64 KB each. Whether each data block is tagged for automatic transfer can be based on analysis of the change history of the file as a whole, or based on the change rate of the file as a whole, or based on analysis of the other data blocks in the file. In addition, each data block in the file may be separately analyzed and tagged, so that some are tagged for automatic transfer and others are not. Alternately, all data blocks in a file may carry the same tag. Effectively, the data is tagged at the file-level rather than at the data block level.

In addition to the change history and the change rate, other factors may also be used to determine tagging. For example, the file type, file extension and contents of the file can affect the change behavior of data blocks. Some types of files are more likely to exhibit local changes, so that a change in one data block does not necessarily imply a change in a distant data block in the same file. Examples are log files and virtual machine images. Other types of files are more likely to exhibit "distributed" changes where changes to the file likely will affect many data blocks. Examples include image files, executable files and encrypted files.

Once a data block/file is tagged for automatic transfer, this tag may remain in place for a predetermined period of time or number of snapshots, after which it expires if the conditions leading to the tag are no longer true.

The approaches described above typically cannot be carried out by the compute infrastructure itself, because the compute infrastructure typically does not track statistics of backups over time and typically does not save previous backups. Instead, these approaches preferably are carried out by the DMS system. The DMS system has access to the snapshots over time and is well-suited to tracking statistics and tagging data blocks/files in connection with providing DMS services. It also typically will save multiple prior snapshots and so can calculate or re-calculate various statistics over time.

Figure 2A:
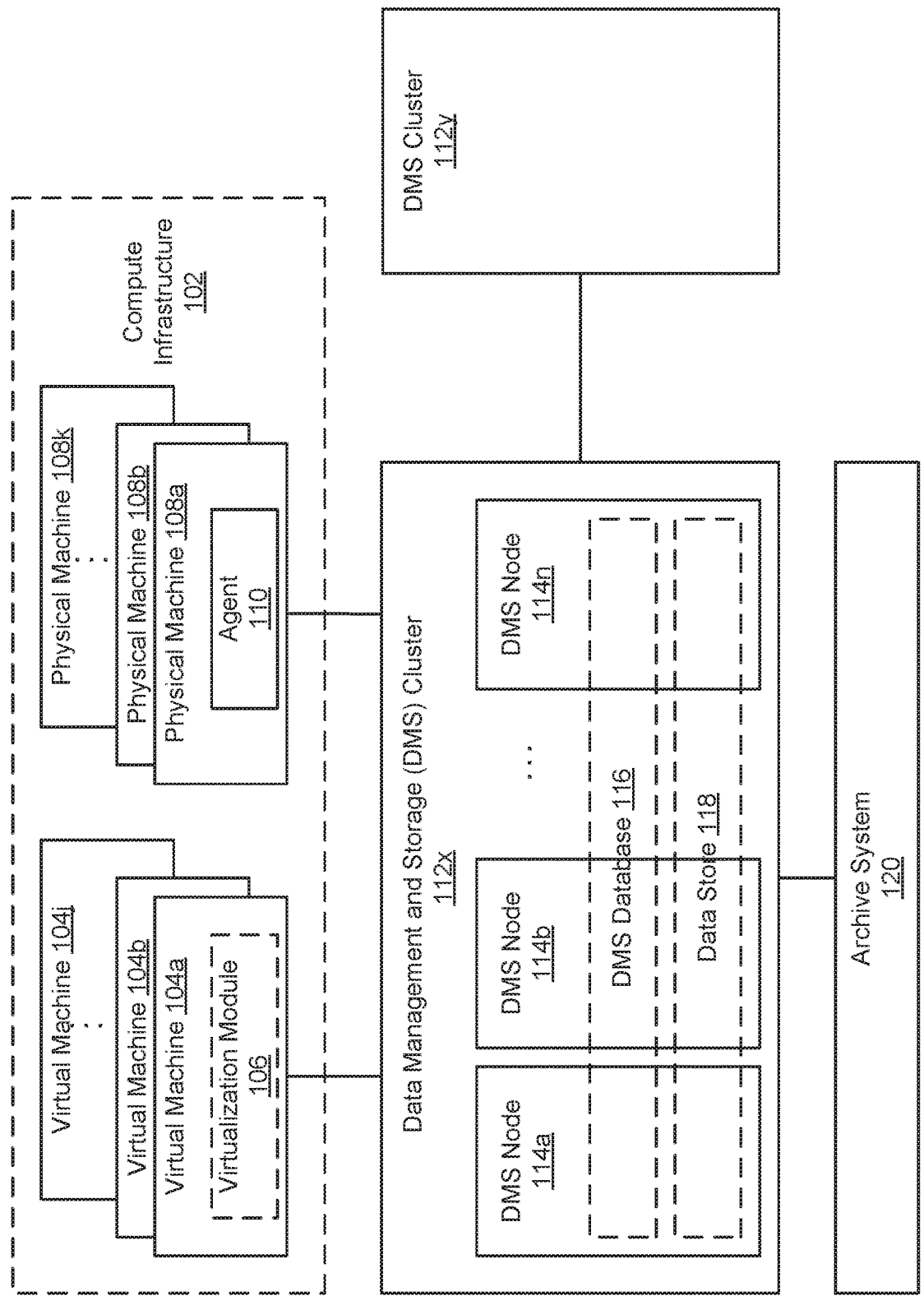
FIG. 2A is a block diagram of a system for managing and storing data, according to one embodiment.

FIGS. 2-3 provide an example DMS system that implements the approach described above. FIG. 2A is a block diagram illustrating a DMS system, according to one embodiment. In this example, the system includes a DMS cluster 112x, a secondary DMS cluster 112y and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. Additional examples include web servers (Linux), intranet servers (Linux), Exchange servers (Windows), MS SQL databases (MS SQL), and NAS systems (NFS). The compute infrastructure can include production environments, in addition to development or other environments.

In this example, the compute infrastructure 102 includes both virtual machines (VMs) 104a-j and physical machines (PMs) 108a-k. The VMs 104 can be based on different protocols. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples.

The DMS cluster 112 manages and stores data for the compute infrastructure 102. This can include the states of machines 104,108, configuration settings of machines 104, 108, network configuration of machines 104,108, and data stored on machines 104,108. Example DMS services includes backup, recovery, replication, archival, and analytics services. The primary DMS cluster 112x enables near instant recovery of backup data. Derivative workloads (e.g., estimating the Pr(change) or otherwise determining which data blocks should be tagged for automatic transfer) may also use the DMS clusters 112x, 112y as a primary storage platform to read and/or modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time is required to retrieve data stored in archive system 120. In contrast, the DMS clusters 112 provide much faster backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114, but interacts with the DMS nodes 114a-n collectively as one entity, namely, the DMS cluster 112.

The DMS nodes 114 are peers and preferably each DMS node 114 includes the same functionality. The DMS cluster 112 automatically configures the DMS nodes 114 as new nodes are added or existing nodes are dropped or fail. For example, the DMS cluster 112 automatically discovers new nodes. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, such as the tags for automatic transfer, as will be described in more detail in FIG. 2. In the following examples, these are shown as tables but other data structures could also be used. The data store 118 contains the actual backup data from the compute infrastructure 102, for example the data blocks for snapshots of VMs or application files. Both the DMS database 116 and the data store 118 are distributed across the nodes 114, for example using Apache Cassandra. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

Figure 2B:
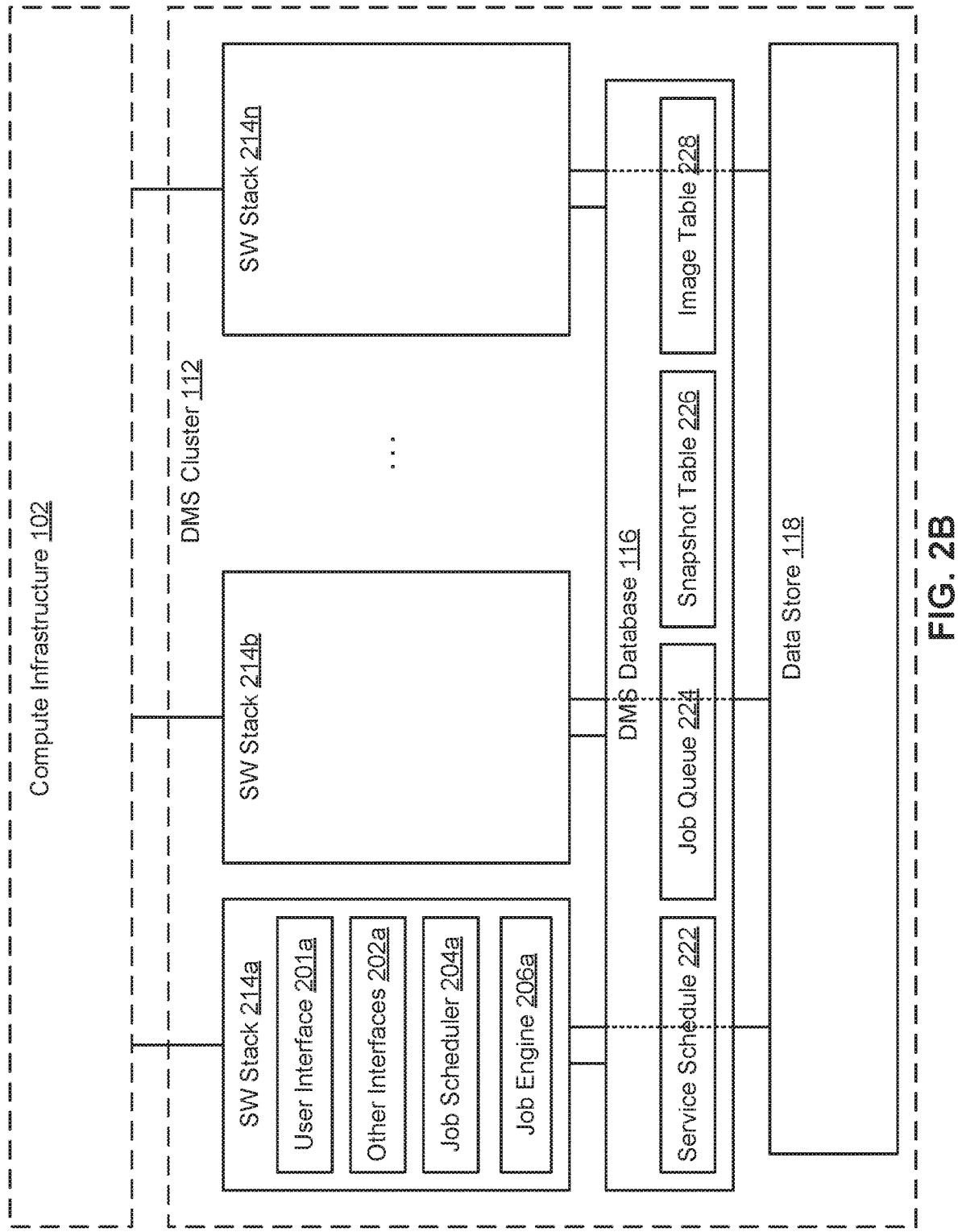
FIG. 2B is a logical block diagram of a data management and storage (DMS) cluster, according to one embodiment.

FIG. 2B is a logical block diagram illustrating an example DMS cluster 112, according to one embodiment. This logical view shows the software stack 214a-n for each of the DMS nodes 114a-n of FIG. 2A. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the agent 110. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112y and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal trash collection or updating of incremental backups, are generated according to the DMS cluster's operation separate from the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204j from one node might post a job, which is then pulled from the queue and executed by a job engine 206k from a different node.

In some cases, a specific job is assigned to or has preference for a particular DMS node (or group of nodes) to execute. For example, if a snapshot for a VM is stored in the section of the data store 118 implemented on a particular node 114x, then it may be advantageous for the job engine 206x on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a,b,c. The image table is an index of images to their location in the data store 118. For example, image a is stored at location aaa of the data store 118, image b is stored at location bbb, etc. More details of example implementations are provided in FIG. 3 below.

DMS database 116 also stores metadata information for the data in the data store 118. The metadata information may include file names, file sizes, permissions for files, and various times such as when the file was created or last modified.

FIG. 3 illustrate operation of the DMS system shown in FIGS. 1-2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112x: every 6 hours for the prior 2 days, every 1 day for the prior 30 days, every 1 month for the prior 12 months.

Replication policy: The backups on the primary DMS cluster for the prior 7 days must also be replicated on the secondary DMS cluster 112y.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job_id identifies a job and start time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal trash collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "1" indicates this is a full image of the snapshot at time t1. The incremental difference is m001.im1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im_list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

In FIG. 3C, the snapshots and images are each represented by a single name: m001.ss1, m001.im1-2, etc. Each of these is composed of data blocks. The incremental image m001.im1-2 is constructed by comparing corresponding data blocks of snapshots m001.ss1 and m001_ss2. However, the data blocks for the previous snapshot m001.ss1 are stored in the data store 118 while the data blocks for the current snapshot exist in the compute infrastructure 102. In order to compare data blocks, either the m001.ss1 data blocks are transferred to the compute infrastructure 102 or the m001_ss2 data blocks are transferred to the DMS cluster 112. The latter is preferred because the DMS cluster's primary purpose is to provide DMS services and because any resulting incremental images will be stored at the DMS cluster. In addition, because the compute infrastructure 102 serves some other primary purpose, it is preferred to reduce the burden on the compute infrastructure 102. However, transferring all the data blocks from the compute infrastructure 102 to the DMS cluster 112 is an inefficient use of network bandwidth if not all of the data blocks have changed. Hence, the approach described above is applied to both reduce the bandwidth used to transfer data blocks from the compute infrastructure 102 to the DMS cluster 112 and to reduce the computing power used at the compute infrastructure 102 to calculate digital fingerprints.

Figure 4:
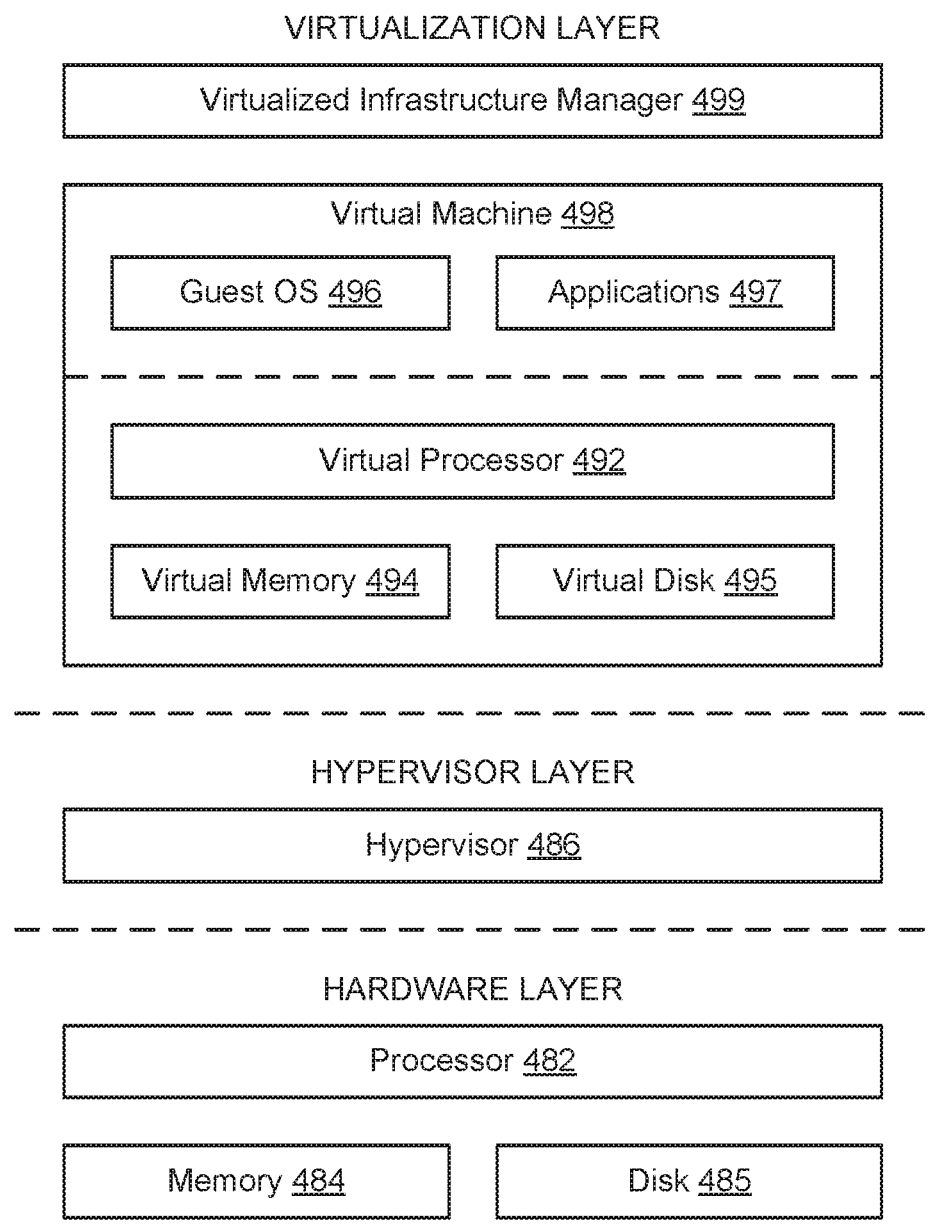
FIG. 4 is a block diagram of a virtual machine, according to one embodiment.

FIG. 4 is a block diagram of a server for a VM platform, according to one embodiment. The server includes hardware-level components and software-level components. The hardware-level components include one or more processors 482, one or more memory 484, and one or more storage devices 485. The software-level components include a hypervisor 486, a virtualized infrastructure manager 499, and one or more virtual machines 498. The hypervisor 486 may be a native hypervisor or a hosted hypervisor. The hypervisor 486 may provide a virtual operating platform for running one or more virtual machines 498. Virtual machine 498 includes a virtual processor 492, a virtual memory 494, and a virtual disk 495. The virtual disk 495 may comprise a file stored within the physical disks 485. In one example, a virtual machine may include multiple virtual disks, with each virtual disk associated with a different file stored on the physical disks 485. Virtual machine 498 may include a guest operating system 496 that runs one or more applications, such as application 497. Different virtual machines may run different operating systems. The virtual machine 498 may load and execute an operating system 496 and applications 497 from the virtual memory 494. The operating system 496 and applications 497 used by the virtual machine 498 may be stored using the virtual disk 495. The virtual machine 498 may be stored as a set of files including (a) a virtual disk file for storing the contents of a virtual disk and (b) a virtual machine configuration file for storing configuration settings for the virtual machine. The configuration settings may include the number of virtual processors 492 (e.g., four virtual CPUs), the size of a virtual memory 494, and the size of a virtual disk 495 (e.g., a 10 GB virtual disk) for the virtual machine 495.

The virtualized infrastructure manager 499 may run on a virtual machine or natively on the server. The virtualized infrastructure manager 499 corresponds to the virtualization module 106 above and may provide a centralized platform for managing a virtualized infrastructure that includes a plurality of virtual machines. The virtualized infrastructure manager 499 may manage the provisioning of virtual machines running within the virtualized infrastructure and provide an interface to computing devices interacting with the virtualized infrastructure. The virtualized infrastructure manager 499 may perform various virtualized infrastructure related tasks, such as cloning virtual machines, creating new virtual machines, monitoring the state of virtual machines, and facilitating backups of virtual machines.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

Figure 5:
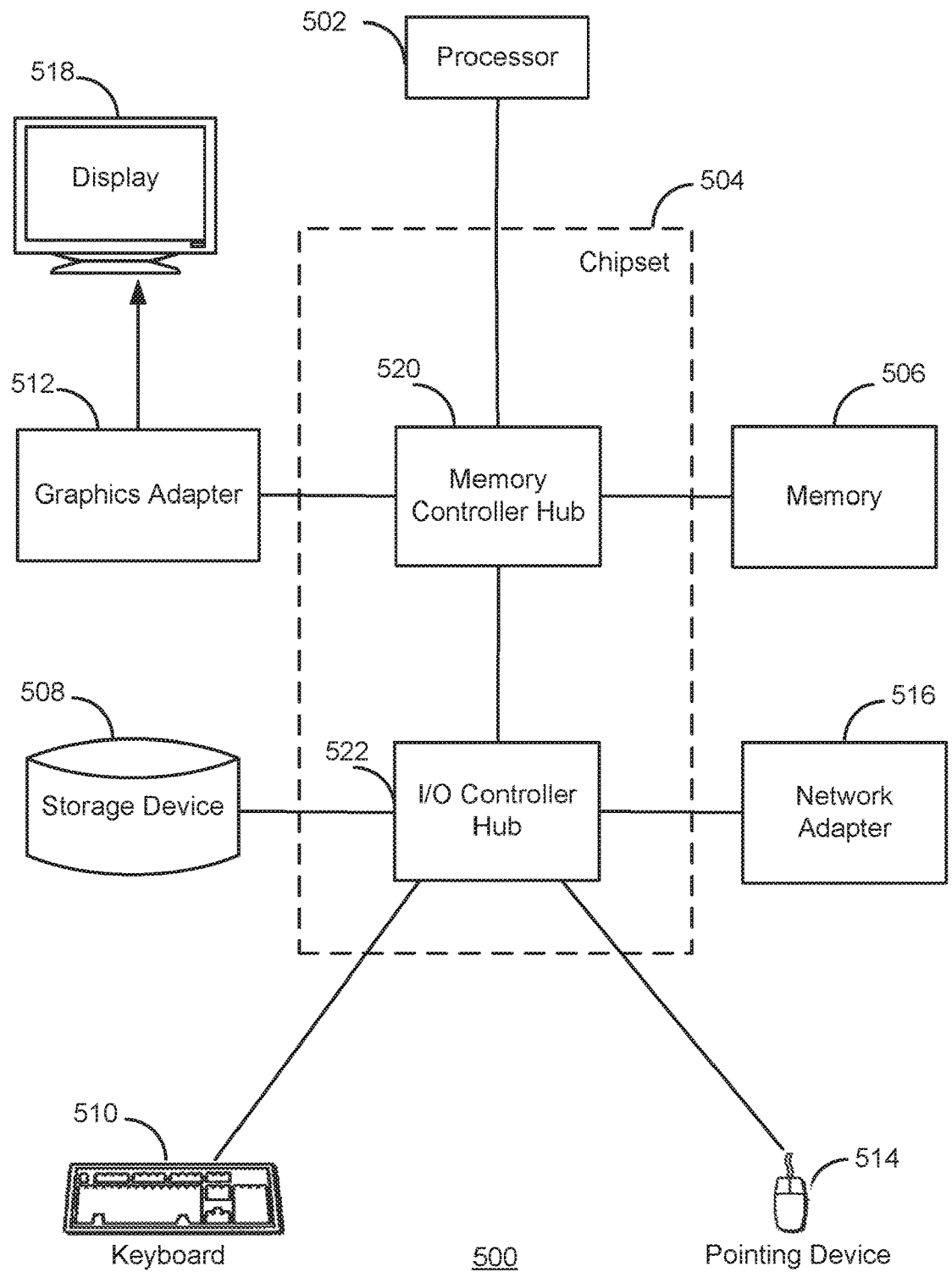
FIG. 5 is a block diagram of a computer system suitable for use in a DMS system, according to one embodiment.

FIG. 5 is a high-level block diagram illustrating an example of a computer system 500 for use as one or more of the components shown above, according to one embodiment. Illustrated are at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display device 518 is coupled to the graphics adapter 512. A storage device 508, keyboard 510, pointing device 514, and network adapter 516 are coupled to the I/O controller hub 522. Other embodiments of the computer 500 have different architectures. For example, the memory 506 is directly coupled to the processor 502 in some embodiments.

The storage device 508 includes one or more non-transitory computer-readable storage media such as a hard drive, compact disk read-only memory (CD-ROM), DVD, or a solid-state memory device. The memory 506 holds instructions and data used by the processor 502. The pointing device 514 is used in combination with the keyboard 510 to input data into the computer system 500. The graphics adapter 512 displays images and other information on the display device 518. In some embodiments, the display device 518 includes a touch screen capability for receiving user input and selections. The network adapter 516 couples the computer system 500 to a network. Some embodiments of the computer 500 have different and/or other components than those shown in FIG. 5. For example, the virtual machine 102, the physical machine 104, and/or the DMS node 110 in FIG. 1 can be formed of multiple blade servers and lack a display device, keyboard, and other components.

The computer 500 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. In a data management and storage (DMS) system, a method for pulling a snapshot of a fileset from a compute infrastructure serviced by the DMS system, the method comprising:
   determining whether a data block in the fileset is currently tagged or not tagged by the DMS system for automatic transfer, wherein whether the data block is tagged or not tagged is based on an analysis by the DMS system of a change history of a portion of the fileset relating to the data block;
   if the data block is not currently tagged for automatic transfer, then:
   transferring a digital fingerprint of the previous snapshot of the data block to the compute infrastructure;
   causing the compute infrastructure to calculate a digital fingerprint of the data block and to determine whether the digital fingerprints of the data block and of the previous snapshot are the same; and
   if the digital fingerprints are not the same, then transferring the data block from the compute infrastructure to the DMS system but, if the digital fingerprints are the same, then not transferring the data block.

2. The method of claim 1, wherein if the data block is currently tagged for automatic transfer, then transferring the data block from the compute infrastructure to the DMS system.

3. The method of claim 1; wherein whether the data block is tagged or not tagged is based on an analysis by the DMS system of a change history of the data block itself.

4. The method of claim 1, wherein the data block is part of a file, and whether the data block is tagged or not tagged is based on an analysis by the DMS system of a change history of the file.

5. The method of claim 4, wherein whether the data block is tagged or not tagged is based on an analysis by the DMS system of a change history of other data blocks contained in the file.

6. The method of claim 1, wherein the data block is part of a file, and all data blocks in the file are tagged the same or similarly.

7. The method of claim 1, wherein the data block is part of a file, and different data blocks in the file are tagged differently.

8. The method of claim 1, wherein the data block is part of a file, and whether the data block is tagged or not tagged is further based on a file type of the file.

9. The method of claim 1, wherein the data block is part of a file, and whether the data block is tagged or not tagged is further based on a file extension of the file.

10. The method of claim 1, wherein the data block is part of a file, and whether the data block is tagged or not tagged is further based on contents of the file.

11. The method of claim 1, wherein the data block is part of a file, and whether the data block is tagged or not tagged is further based on a size of the file.

12. The method of claim 1, wherein whether the data block is tagged or not tagged is further based on a change rate for the previous snapshot of the data block.

13. The method of claim 1, wherein the data block is part of a file, and whether the data block is tagged or not tagged is further based on a change rate for a previous snapshot of the file.

14. The method of claim 1, wherein whether the data block is tagged or not tagged is further based on a change history for two or more previous snapshots of the portion of the fileset relating to the data block.

15. The method of claim 1, wherein whether the data block is tagged or not tagged is further based on whether an estimated probability that the data block has changed since the previous snapshot is greater than 1−(a cost of calculating the digital fingerprint of the data block and determining whether the digital fingerprints of the data block and of the previous snapshot are the same)/(a cost of transferring the data block).

16. The method of claim 1, wherein a tag for automatic transfer of the data block expires after a predetermined period.

17. The method of claim 1, wherein the digital fingerprint is a hash.

18. The method of claim 1, wherein:
the DMS system comprises a DMS cluster of peer DMS nodes, a DMS database implemented across the peer DMS nodes and a distributed data store implemented across the peer DMS nodes;
whether the data block is tagged or not tagged is stored in the DMS database, and the previous snapshot is stored in the distributed data store;
jobs to transfer data blocks from the compute infrastructure to the distributed data store are posted to a job queue accessible by the peer DMS nodes; and
the peer DMS nodes autonomously fetch and execute jobs from the job queue.

19. A data management and storage (DMS) cluster comprising:
a plurality of peer DMS nodes that autonomously service a compute infrastructure;
a DMS database implemented across the peer DMS nodes;
a distributed data store implemented across the peer DMS nodes;
wherein each of the peer DMS nodes includes a software stack for, in response to a job of pulling a snapshot of a fileset:
determining whether a data block in the fileset is currently tagged by the DMS system for automatic transfer, wherein whether the data block is tagged depends on the DMS system's analysis of a change history of a portion of the fileset relating to the data block or not tagged
if the data block is not currently tagged for automatic transfer, then:
transferring a digital fingerprint of the previous snapshot of the data block to the compute infrastructure;
causing the compute infrastructure to calculate a digital fingerprint of the data block and to determine whether the digital fingerprints of the data block and of the previous snapshot are the same; and
if the digital fingerprints are not the same, then transferring the data block from the compute infrastructure to the DMS system but, if the digital fingerprints are the same, then not transferring the data block.

20. The DMS cluster of claim 19, wherein if the data block is currently, tagged for automatic transfer, then transferring the data block from the compute infrastructure to the DMS system.

21. The DMS cluster of claim 19, wherein at least some of the peer DMS nodes are either (a) physical machines comprising a hardware processor, memory, and data storage in addition to the software stack; and/or (b) virtual machines.

22. A non-transitory computer-readable medium comprising instructions that when executed by a processor cause the processor to execute a method for pulling a snapshot of a fileset of a compute infrastructure serviced by a DMS system, the method comprising:
determining whether a data block in the fileset is currently tagged by the DMS system for automatic transfer, wherein whether the data block is tagged depends on the DMS system's analysis of a change history of a portion of the fileset relating to the data block;
if the data block is not currently tagged for automatic transfer; then:
transferring a digital fingerprint of the previous snapshot of the data block to the compute infrastructure;
causing the compute infrastructure to calculate a digital fingerprint of the data block and to determine whether the digital fingerprints of the data block and of the previous snapshot are the same; and
if the digital fingerprints are not the same, then transferring the data block from the compute infrastructure to the DMS system but; if the digital fingerprints are the same, then not transferring the data block.

23. The non-transitory computer-readable medium of claim 22, wherein if the data block is currently tagged for automatic transfer, then transferring the data block from the compute infrastructure to the DMS system.

* * * * *

UNITED STATES PATENT AND TRADEMARK OFFICE
CERTIFICATE OF CORRECTION

PATENT NO. : 10,909,000 B2  
APPLICATION NO. : 16/397675  
DATED : February 2, 2021  
INVENTOR(S) : Looi Chow Lee Page 1 of 1

It is certified that error appears in the above-identified patent and that said Letters Patent is hereby corrected as shown below:

In the Specification

In Column 4, Line 38, delete "computer" and insert --compute-- therefor

In Column 6, Line 15, delete "computer" and insert --compute-- therefor

In Column 6, Line 58, delete "204j" and insert --204a-- therefor

In Column 7, Line 60, delete "start time" and insert --start_time-- therefor

In Column 9, Line 34, delete "495." and insert --498.-- therefor

In Column 10, Line 18, delete "102," and insert --104,-- therefor

In Column 10, Line 18, delete "104," and insert --108,-- therefor

In Column 10, Line 19, delete "110" and insert --114-- therefor

In the Claims

In Column 10, Line 65, in Claim 3, delete "claim 1;" and insert --claim 1,-- therefor In Column 12, Line 30, in Claim 20, delete "currently," and insert --currently-- therefor In Column 12, Line 48, in Claim 22, delete "transfer;" and insert --transfer,-- therefor In Column 12, Line 57, in Claim 22, delete "but;" and insert --but,-- therefor Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*